United States Patent Office 3,796,583
Patented Mar. 12, 1974

3,796,583
PROCESS FOR MAKING FOUNDRY MOLDS
Janis A. Bungs, Willoughby, and Neil W. Stillman, Madison, Ohio, assignors to Diamond Shamrock Corporation, Cleveland, Ohio
No Drawing. Continuation-in-part of application Ser. No. 665,742, Sept. 6, 1967. This application Sept. 17, 1970, Ser. No. 73,075
Int. Cl. B28b 7/28
U.S. Cl. 106—38.8     8 Claims

ABSTRACT OF THE DISCLOSURE

Molds for use in metal casting are provided by mixing a major portion of a particulate refractory material with a minor amount of a binder which consists essentially of coal tar, a polyisocyanate and a catalyst, such as an amine. Such a mixture of refractory material and binder will air-set at ambient temperatures to give a satisfactory mold or core. Furthermore, if there is added to the binder composition a deep-set promoting agent, such as an epoxide or polyol, the mold will set even more uniformly and rapidly throughout its cross-section.

CROSS-REFERENCE TO A CO-PENDING APPLICATION

This application is a continuation-in-part of our co-pending application for U.S. Letters Patent Ser. No. 665,742, filed Sept. 6, 1967, now abandoned.

BACKGROUND OF THE INVENTION

It is well known that molds for use in metal casting must be strong enough to support the weight of the metal poured into the mold in order that upon solidification the liquid metal will retain the shape of the mold. Other properties which must be evidenced by the mold include; ease of separation of the mold from the solidified metal; permeability to gases formed during the casting operation; resistance to the erosive effect of the hot liquid metal and sufficient brittleness to permit easy removal, or "shake-out" of the solidified metal from the mold. A number of binder materials have been proposed in the past for use in the formation of such molds.

For example, in addition to sodium silicate and other inorganic binder materials, certain naturally-occurring organic compounds have been advocated as being useful in the formation of foundry molds and cores. These materials however, e.g., oils and coal tar pitch, have required that heat or pressure be applied in order to obtain the desired set.

More recently it has been proposed to use synthetic organic materials containing, for example, phenol-formaldehyde or urea-formaldehyde resins or oxygenated oils, as binders for refractory compositions. Again, the use of certain of these materials has required that heat be applied to the mixture of refractory material and binder in order to effect the desired set. More recently even, other polymeric organic materials of, for example, the alkyd-isocyanate or furan-type, have been proposed which do not require the use of heat to obtain the desired set. However these materials have had the various disadvantages of being expensive, slow to develop sufficient green strength and difficult to release from the pattern as well as tending to dissolve pattern paints or lacquers and releasing volatile solvents during casting.

STATEMENT OF THE INVENTION

Thus it is an object of the present invention to provide a process using an inexpensive and effective composition for the formation of molds from refractory materials.

A further object of this invention is to provide a process employing a binder composition in combination with a particulate refractory material, which combination will set without the application of heat.

These and other objects of the present invention will become apparent to those skilled in the art from the description and claims that follow.

It has now been found that a foundry mold or core having desirable and advantageous physical properties may be obtained by using, in combination with a particulate refractory material, a binder for said refractory material, which binder consists essentially of; (a) coal tar, (b) polyisocyanate and (c) a catalyst. When such a combination of refractory material and binder is used and the mixture is placed in a mold-defining structure, hardening will occur without the application of heat, i.e., at ambient temperatures. It has further been found that if the above-described binder composition additionally contains a deep-set promoting agent, an even more uniform and rapid hardening of the mixture will be obtained.

DESCRIPTION OF THE PREFERRED EMBODIMENTS

By the use of the term "mold" throughout the specification and claims it is intended to refer to molds and cores used generally in the foundry industry and which are formed by introducing or "ramming" a mixture of particulate refractory material and a binder therefor into a mold-defining structure, i.e., a pattern or core box, whereupon the mixture hardens to assume the shape of the pattern into which it has been introduced and thereby forms a mold for use in metal casting.

The term "particulate refractory material" refers to finely-divided refractory materials, especially silica sand, which are in wide-spread use throughout the foundry industry. The amount of refractory material to be used in the practice of the present invention is within the range of from 92–99 percent by weight of the total of refractory material plus binder, preferably 97–98.5 percent by weight. Expressed in another and somewhat more convenient manner, from 10 to 80, preferably 15 to 30 parts by weight of binder may be used per 1,000 parts by weight of refractory material. These figures will vary somewhat with the desired final hardness of the mold to be formed, the physical and chemical nature of the sand or other refractory material used and the like, these factors and the method of determining the optimum quantity of particulate refractory material to be used being well within the skill of one familiar with the art.

By the use of the term "coal tar" it is intended to refer to the pyrogenous distillates obtained by the destructive distillation of coal, particularly bituminous coal. Useful coal tars consist generally of various aromatics, tar acids (primarily monofunctional hydroxyl compounds, e.g., phenolics), tar bases (e.g., pyridine) and pitch. Those coal tars containing the largest amounts of reactive monofunctional components are most useful in the present invention, although all tars may be employed with some success. The coal tar comprises a major portion, preferably 55–70%, of the binder composition, desirably so because of its low cost.

With regard to the polyisocyanate compound useful in the practice of the present invention, it may be generally stated that any polyisocyanate, whether aromatic, aliphatic or heterocyclic, is useful. In other words, preferably, any suitable organic radical, including acylic, alicylic, aromatic and heterocyclic groups, may be bonded to a plurality of isocyanate groups to form a polyisocyanate useful in the process of the present invention. Illustrative of some useful polyisocyanates are, tetramethylene diisocyanate, hexamethylene diisocyanate, phenylene diisocyanates, toluene diisocyanates, diphenylmethane diisocyanate, toluene 2,4,6-triisocyanate and the like. Especially useful at this time are the commercially available, crude diphenylmethane diisocyanates such as Mondur MR, a trademarked product of the Mobay Chemical Co. Of course, it will be understood that mixtures of polyisocyanates may be used with satisfactory results. The amount of polyisocyanate to be used in the binder will vary within the range of 25 to 100 parts by weight, per 100 parts of coal tar, preferably 44 to 52 parts.

By the use of the term "catalyst" it is intended to refer to those compounds which are capable of accelerating the reaction of the coal tar and the polyisocyanate. The type of compound useful for this purpose should be readily apparent to those skilled in the art and thus the following examples are illustrative only and not limitative. Such compounds include, notably, the aliphatic, aromatic and heterocyclic tertiary amines such as trimethylamine, tetramethylethylenediamine, benzyldimethylamine, N-methyl morpholine and tris(dimethylaminomethyl) phenol; metallic driers such as the metal naphthenates, e.g., cobalt naphthenates; heavy metal organic salts such as dibutyl tin dilurate and mixtures of the forgoing. Preferred at this time are the tertiary amines having low volatility such as tris(dimethylaminomethyl)phenol.

Obviously the quantity of the catalyst to be used will vary with such factors as hardening time desired, the exact nature of the polyisocyanate and coal tar components, the quantity of the aforementioned ingredients, the molecular weight and functionality of the catalyst and other factors. Thus, for any given composition the quantity of catalyst to be used is readily determined by experimentation that is well within the skill of those familiar with the art. In most instances it will be found that a quantity of catalyst within the range of from 0.05 to 10 parts by weight, per 100 parts of coal tar, preferably 0.4 to 2 parts, will be useful.

As is mentioned hereinabove, a particulate refractory material, in the presence of a binder of the present invention consisting essentially of coal tar, polyisocyanate and a catalyst, will set at ambient temperatures to form a mold having the desired hardness properties. However, it has further been found that if there is included in the aforesaid binder composition an agent capable of promoting a deep-set, the refractory material-binder composition will harden even more rapidly and uniformly. This property is, of course, most useful in the formation of molds having large cros-sections which normally are difficult to set throughout.

By the use of the phrase "a deep-set promoting agent" it is intended to refer to certain compounds containing active hydrogen which are useful in minor amounts for this purpose. The object of the deep-set promoter is that it be more reactive with the polyisocyanate than is the coal tar thus providing a deep, quick set of the mixture of binder and refractory material. The preferred deep-set promoters are water and those compounds containing more than one active hydrogen atom per molecule such as polyhydric alcohols (polyols) e.g., aliphatic glycols and triols; oxypropylated and oxyethylated compounds based on, for example, sorbitol, pentaerythritol and trimethylolpropane; primary and secondary amines, and hydroxyl - containing polyesters and other hydroxyl-containing polymeric materials well known to those skilled in the art. It is also possible to use compounds capable of being converted during the curing reaction into active hydrogen-containing materials, e.g., the diepoxides such as the diglycidyl ether of butanediol. The quantity of the deep-set promoting agent used will of course vary with the result desired, the molecular weight and functionality of the agent and the quantity and identity of the other ingredients of the binder composition. However, only minor amounts are generally used since their reaction with the polyisocyanate results primarily in the formation of polymers which detract from the final strength of the core. Amounts within the range of from 0.05 to 10 parts by weight, per 100 parts of coal tar, especially 2 to 4 parts, are preferred at this time.

Obviously it is entirely possible to use as an ingredient of the binder composition, one organic material which combines the properties of the deep-set promoting agent and the catalyst. Such compounds, of which triethanolamine, 2,2-(phenylimino) diethanol, N,N,N',N'-tetrakis-(2-hydroxypropyl) ethylene-diamine and oxypropylated diethylenetriamine, are examples, are within the scope of this invention.

In summary it may be said that the preferred compositions of the present invention include two major components, coal tar and polyisocyanate, and two minor components, a catalyst and a deep-set promoter. A typical composition includes about 1,000 parts sand and 18 parts of a binder consisting essentially of 100 parts coal tar, 48 parts diisocyanate, 0.4 parts amine and 2 parts polyol all parts by weight.

Several different methods present themselves for providing the binder compositions of the present invention ready for combination with the particulate refractory material. Obviously the ingredients of the binder may be afforded individually and mixed with the particulate refractory material just prior to use. However, various sub-combinations of the three or four component binder system are possible and desirable in that the number of mixing and measuring steps is in this manner reduced. For instance, the binder composition may be provided in a two package system. In this instance the first package could contain the coal tar and the catalyst, with the second package containing the remaining ingredients, e.g. the polyisocyanate and the deep-set promoting agent. Alternately, the first package could contain the coal tar, the catalyst and the deep-set promoter, the second portion consisting therefore of the polyisocyanate alone. Obviously, these sub-combinations must be chosen with their compatability in mind if they are to be stored for any length of time prior to use.

It has further been found that it is desirable, although not essential, to follow a certain sequence of addition when mixing the binder composition with the particulate refractory material. Particularly, it has been found desirable to coat the particles of refractory material with a liquid combination of coal tar, catalyst and, optionally, deep-set promoting agent. After this application of the coal tar, catalyst and, if desired, the deep-set promoter, to the refractory material and the thorough mixing thereof, it is then possible to add thereto, with mixing, the remaining ingredients, i.e., the polyisocyanate, and if not previously added, the deep-set promoting agent. By this manner of operation, more uniform and higher final strengths will be obtained.

It will be appreciated that the compositions of the present invention provide advantages over prior practices using other air-set organic binders. Thus with the instant compositions there is less gassing of the mold itself when in contact with the molten metal than with, for example, an alkyd-isocyanate type air-set binder which has a volatile solvent base. Furthermore, since the binder film which surrounds each particle of the refractory material using the instant compositions is believed to contract somewhat upon setting, there is the advantage of increased permeability to the gases that are formed during the casting operation. Also, release of the mold from the pattern is cleaner and easier than with prior chemical or air-set binders. A further and important advantage is the fact that a major component of the instant binder is a crude bituminous material which is more desirable economically than relatively expensive organic resins.

In addition to the advantages of the present compositions over air-set binders currently in use, it will be understood by one skilled in the art that the practice of the present invention also involves many improvements and presents several advantages over the use of previous heatset binder compositions, e.g., bituminous compositions such as coal tar pitch.

The primary advantage of the use of coal tar pitch according to the prior art has been the extremely high "hot strength" characteristics of refractory cores or molds made using pitch alone as a binder. However, this very advantage has also been a disadvantage in that strengths are so high as to interfere with the shake-out properties of the molds once the casting operation is complete.

Further disadvantages of the prior art bituminous material-containing compositions have included the need for pressure and/or heat, e.g., 450°–600° F., the need to use solvents as diluents to reduce to a workable level the viscosity of the normally solid or highly viscous bituminous materials, an almost total lack of green strength at room temperatures and relative impermeability to gases formed during the casting operation, thereby resulting in defects in the surface of the casting.

With the practice of the present invention, however, it is possible to obtain the advantages of the use of bituminous materials, which advantages include desirable economics and high ultimate strength, without the aforesaid difficulties. Thus, a savings is obtained in that there is no heat requirement, i.e., the molds set at room temperatures, with the attendant advantage that the patterns used to form the molds are not tied up for long periods of time during heating and cooling operations but rather are ready for re-use in a relatively short time. This is due to the fact that the compositions of the present invention, when combined with a refractory material, exhibit high green strength at room temperatures after a relatively short period of time. Furthermore, it has been found that the molds and cores obtained by the practice of the present invention exhibit a relatively high permeability to gases formed during casting thereby resulting in a more perfect surface on the casting itself. Also, since the bituminous material used is coal tar rather than coal tar pitch, there is no need for diluents in order to obtain a workable mixture.

While not wishing to be bound by any theory, it is thought that many of the advantages obtained by the practice of this invention may be considered to be unexpected, particularly the increased permeability to gases and the high final strength of the molds while still obtaining desirable shake-out characteristics, for the following reasons. It would be thought, since many of the reactive groups present in coal tar are phenolic, that the combination of coal tar with polyisocyanates would result in a composition unstable in the presence of such extremes of heat. This is due to the fact that it is well known in organic chemistry that phenols are often used as blocking agents to prevent the reaction of isocyanates at lower temperatures. When phenol-blocked isocyanates are then heated to temperatures in excess of 150° C., decomposition occurs resulting in the availability of the isocyanates for further reaction. Thus, if one of the reactions taking place in the practice of the present invention involves that of phenols with polyisocyanates, it would be expected that severe decomposition would occur at the temperatures present when the cast metal is poured into the mold, thus rendering the mold unusable. However, it is surprisingly found that the strength of the molds or cores is considered to be adequate after the casting operation is completed while still providing excellent shake-out characteristics.

A primary advantage of the instant binders over many prior compositions is that a set is rapidly and uniformly obtained throughout the mold formed therewith, regardless of its dimensions, when the deep-set promoter is included in the formulation. Thus these binders will be of special value for use in rapidly fabricating large molds having uniformly high final strengths.

In order that those skilled in the art may more readily understand the present invention and certain preferred methods by which it is carried into effect, the following illustrative examples are afforded. In these examples certain physical measurements of the properties of molds formed with combinations of binders and refractory materials are set forth. These physical properties are determined as follows. Green strength is determined according to the procedure set forth under the heading "Method for Determining Green Compressive Strength" to be found in Section 8, page 2 of the Foundry Sand Handbook, 7th edition published by the American Foundrymen's Society. Tensile strength is determined according to the procedure set forth under the heading "Methods for Determining Tensile Strength" appearing in Section 8, page 6 of the aforementioned handbook. Each of these two tests is standard and recognized throughout the industry. In each of the following examples, unless otherwise specified, all operations are conducted at 70° F. and a relative humidity of from 50 to 60 percent. Furthermore all "parts" referred to are parts by weight.

EXAMPLE 1

A typical binder composition of the present invention consists of 100 parts by weight of SC–50 (trademark of the United States Steel Corp. for a processed coal tar), 50 parts of Mondur MR (trademark of Mobay Chemical Co. for a crude p,p'-diphenylmethane diisocyanate and 0.4 part by weight of DMP–30 [trademark of the Rohm and Haas Co. for tris(dimethylaminomethyl)phenol]. In this example DMP–30 is combined with the coal tar and then the quantity of coal tar -DMP–30 mixture indicated in Table I (Part A) is mixed with 1,000 parts by weight of Ottawa 70 silica sand for 2 minutes. Subsequently the amount of Mondur MR indicated in Table I (Part B) is added to the sand-coal tar mixture and mixing is continued for an additional 2 minutes. This mixture is rammed into a pattern, allowed to set until sufficient green strength is obtained to allow the pattern to be stripped from the mold and then allowed to harden until final strength has been reached. Test specimens made in this manner and tested after curing at ambient temperatures for 24 hours give tensile strengths at various binder levels as indicated in Table I.

TABLE I

| Part A (parts) | Part B (parts) | Binder level, part A and part B | Tensile strength, p.s.i. |
| --- | --- | --- | --- |
| 6.30 | 3.15 | 9.45 | 111 |
| 7.55 | 3.75 | 11.30 | |
| 8.75 | 4.40 | 13.15 | 170 |
| 10.05 | 5.00 | 15.05 | 221 |
| 11.25 | 5.60 | 16.85 | 242 |
| 12.55 | 6.25 | 18.80 | 258 |
| 13.75 | 6.90 | 20.65 | 268 |
| 15.05 | 7.50 | 22.55 | 265 |
| 16.25 | 8.10 | 25.35 | 302 |
| 18.80 | 9.35 | 28.10 | |
| 37.65 | 18.75 | 56.40 | >367 |
| 50.20 | 25.00 | 75.20 | >367 |
| 62.75 | 31.25 | 94.00 | >367 |

It will be seen that using the compositions of the present invention it is possible to obtain a mold having satisfactory final strength characteristics, without the application of heat, over a wide range of binder levels.

EXAMPLE 2

In order to illustrate the effect of the polyisocyanate: coal tar ratio on the green strength build-up and tensile strength properties of the refractory material-binder mixture, 1,000 parts of Ottawa 70 sand is combined with 20 parts of binder in which the quantity of crude coal tar and isocyanate is varied as indicated in Table II. The quantity of DMP–30 is held constant at 0.05 part. Binder ingredients are combined with each other and with the sand as described in Example 1. Specimens for green strength build-up and tensile strength determination are formed and tested with the results indicated in Table II.

TABLE II

| Coal tar (parts) | Isocyanate (parts) | Green strength (p.s.i.) | | Tensile strength (p.s.i.) |
|---|---|---|---|---|
| | | 20 minutes | 35 minutes | |
| 18.1 | 1.8 | 0.5 | 0.6 | 0 |
| 16.6 | 3.3 | 0.7 | 6.4 | 30 |
| 15.3 | 4.6 | 0.7 | 5.4 | 61 |
| 14.2 | 5.7 | 0.7 | 9.7 | 140 |
| 12.6 | 6.3 | 0.8 | 8.6 | 223 |
| 12.5 | 7.5 | 1.1 | 14.2 | 186 |
| 11.1 | 8.8 | 0.5 | 3.5 | 216 |
| 10.0 | 10.0 | 0.5 | 0.9 | 169 |
| 6.7 | 13.3 | 0 | 0 | 108 |
| 5.0 | 15.0 | 0 | 0 | 105 |

The above tests are also conducted substituting 48 parts of hexamethylene diisocyanate, toluene diisocyanate and phenyl diisocyanate, per 100 parts of coal tar. While final strengths are not as high as in the preferred embodiment, it is shown that molds may be formed using a variety of polyisocyanates.

EXAMPLE 3

To illustrate the use of various deep-set promoting agents, 1,000 parts of Ottawa 70 sand is combined with 13.25 parts of a mixture of 100 parts SC-50 coal tar, 2 parts DMP-30 and 4 parts of the deep-set promoting agent indicated in Table III. Subsequently, 6.0 parts of Mondur MR is added as described in Example 1. Three 4 ounce jars are packed to the top with the molding composition and sealed. The compositions are then tested following curing for 1, 4 and 6 hours with results as indicated in Table III.

TABLE III

| Deep-set promoter | Firmness of composition | | |
|---|---|---|---|
| | 1 hour | 4 hours | 6 hours |
| None | Soft | Soft | Soft |
| Araldite 507 [1] | do | Firm | Firm |
| Quadrol [2] | do | Soft | Hard |
| Hexol G-2406 [3] | do | Firm | Do |
| 1,2,6-hexanetriol | Soft | do | Firm |
| Pluracol PeP-450 [4] | do | Soft | Do |
| Niax Hexol LS-490 [5] | Firm | Firm | Hard |

[1] Trademark of the Ciba Products Co. for a liquid expoxy resin modified with a reactive monoepoxide diluent.
[2] Trademark of the Wyandotte Chemical Corp. for N,N,N',N'-tetrakis (2-hydroxypropyl) ethylenediamine.
[3] Trademark of Atlas Chemicals for an oxypropylated sorbitol having a M.W. of 530 and a hydroxy number of 643.
[4] Trademark of the Wyandotte Chemical Corp. for a pentaerythritol-based propylene oxide derivative.
[5] Trademark of the Union Carbide Chemical Corp. for a sorbitol-based polyether polyol.

EXAMPLE 4

To further demonstrate the utility of various deep-set promoting agents and their effect on the green strength build-up and tensile strength of the molded compositions, 1,000 parts of Ottawa 70 sand is combined with 12.80 parts of a mixture of 100 parts of SC-50 coal tar, 0.4 part of DMP-30 and 2 parts of the deep-set promoting agent indicated in Table IV. Subsequently, 6.25 parts of Mondur MR is added according to the procedure of Example 1. Test specimens are then formed and evaluated with the results shown in Table IV.

TABLE IV

| Deep-set promoter | Green strength (p.s.i.) | | Tensile strength (p.s.i.) |
|---|---|---|---|
| | 20 minutes | 35 minutes | |
| None | 0.9 | 8.4 | 261 |
| Araldite 507 | 0.8 | 4.8 | 252 |
| Quadrol | 3.0 | 18.5 | 2 |
| Hexol G-2406 | 1.1 | 11.0 | 2 |
| Hexol G-2410 [1] | 1.4 | 18.5 | 26 |
| Pluracol PeP-450 | 3.2 | 18.7 | 223 |
| Pluracol TPE-4542 [2] | 1.7 | 12.4 | 241 |
| Tetronic 304 [3] | 1.6 | 13.8 | 280 |

[1] Trademark of Atlas Chemicals for an oxypropylated sorbitol having a M.W. of 690 and a hydroxy number of 490.
[2] Trademark of the Wyandotte Chemical Corp. for an ethylene o terminated, propylene oxide adduct of trimethylolpropane.
[3] Trademark of the Wyandotte Chemical Corp. for an oxypropylene oxyethylene polyol derived from ethylenediamine.

EXAMPLE 5

Table V illustrates the effect of various catalysts on both the green strength build-up and final strength of molds formed therewith. For these tests 12.5 parts of coal tar (SC-50) is combined with 0.05 part of catalyst. This mixture is then combined with 1,000 parts by weight of Ottawa 70 sand and mixed for 2 minutes. Subsequently, 6.25 parts of Mondur MR is added to the sand-coal tar mixture and the mixing is continued for an additional 2 minutes. Test specimens are formed and evaluated with results shown in Table V.

TABLE V

| Catalyst | Green strength (p.s.i.) | | Tensile strength (p.s.i.) |
|---|---|---|---|
| | 20 minutes | 35 minutes | |
| None | 0.5 | 1.9 | 242 |
| Cobalt naphthenate | 0.5 | 1.1 | 248 |
| Dibutyltin bis (S,S-isooctyl mercaptoacetate) | 2.7 | 18.6 | 262 |
| N,N,N',N'-tetramethyl-ethylenediamine | 0.5 | 0.9 | 252 |
| DMP-30 | 0.9 | 9.3 | 253 |

While the effect asserted on the final results using certain of the above catalysts would appear to be minimal, it will be noted from the following example that the catalytic effect is sometimes most noticeable at higher catalyst levels.

EXAMPLE 6

This example illustrates the effect of the quantity of the catalyst on both green strength build-up and final strength. The quantities of coal tar (SC-50) and Mondur MR are as in Example 5. With the exception of the variables indicated in the following Table VI, all conditions, including the quantity of coal tar and Mondur MR, are as in Example 5.

TABLE VI

| Agent | Quantity (parts) | Green strength (p.s.i.) | | Tensile strength (p.s.i.) |
|---|---|---|---|---|
| | | 20 minutes | 35 minutes | |
| DMP-30 | 0.00 | 0.7 | 2.2 | 243 |
| | 0.05 | 1.0 | 9.6 | 276 |
| | 0.10 | 2.7 | 18.6 | 245 |
| | 0.15 | 15.1 | >18.7 | 224 |
| | 0.20 | 17.1 | >18.7 | 192 |
| | 0.25 | >18.7 | >18.7 | 208 |
| T-31 | 0.00 | 0.7 | 1.7 | 246 |
| | 0.05 | 2.5 | 17.6 | 235 |
| | 0.10 | 3.5 | >18.7 | 236 |
| | 0.15 | 9.9 | >18.7 | 208 |
| | 0.20 | 17.3 | >18.7 | 191 |
| | 0.25 | 18.6 | 18.7 | 166 |
| LA-700 [1] | 0.00 | 0.6 | 1.4 | 226 |
| | 0.05 | 0.8 | 1.1 | 247 |
| | 0.10 | 0.8 | 1.3 | 302 |
| | 0.15 | 0.8 | 1.5 | |
| | 0.20 | 1.1 | 5.2 | 293 |
| | 0.25 | 1.1 | 7.8 | 272 |

[1] An oxypropylated diethylenetriamine manufactured by the Union Carbide Corp.

While the invention has been described with reference to several embodiments thereof, it is not to be so limited since changes and alterations may be made therein which are within the full and intended scope of the invention, as defined in the appended claims.

We claim:

1. An improvement in the process for the formation of molds for use in the production of metal castings by the introduction into a mold-defining structure of a mixture of a particulate refractory material and a binder for the refractory material, followed by reaction of the binder at ambient temperatures, which improvement consists essentially of binding the refractory particles together by applying thereto a reactive binder composition consisting essentially of;

(a) a coal tar, and, for each 100 parts of coal tar,
(b) from 25 to 100 parts of a polyisocyanate and,
(c) from 0.5 to 10 parts of a catalyst for the reaction of the coal tar with the isocyanate, from 10 to 80 parts of said binder being present per 1,000 parts of said refractory material.

2. A process as in claim 1 wherein the polyisocyanate is a mixture of isocyanates consisting predominantly of a diisocyanate.

3. The process as in claim 1 wherein the catalyst is selected from the group consisting of tertiary amines, metallic driers and heavy metal salts of organic acids.

4. An improvement in the process for the formation of molds for use in the production of metal castings by the introduction into a mold-defining structure of a mixture of a particulate refractory material and a binder for the refractory material, followed by reaction of the binder at ambient temperatures, which improvement consists essentially of binding the refractory particles together by applying thereto from 10–80 parts per 1000 parts of refractory material of a reactive binder consisting essentially of;
 (a) a coal tar, and, for each 100 parts of coal tar,
 (b) from 25 to 100 parts of a polyisocyanate,
 (c) from 0.05 to 10 parts of a catalyst for the reaction of the coal tar and the isocyanate and
 (d) from 0.05 to 10 parts of an active hydrogen-containing deep-set promoting agent selected from the group consisting of water; polyhyldric alcohol; oxypropylated and oxyethylated sorbitol, pentaerythritol and trimethylolpropane; diepoxides, and primary and secondary amines.

5. A process as in claim 4 wherein the polyisocyanate is a mixture of isocyanates consisting predominantly of a diisocyanate.

6. A process as in claim 4 wherein the catalyst is selected from the group consisting of tertiary amines, metallic drier and heavy metal salts of organic acids.

7. An improvement in the process for the formation of molds for use in the production of metal castings by the introduction into a mold-defining structure of a mixture of a particulate refractory material and a binder for the refractory material, followed by reaction of the binder at ambient temperatures, which improvement consists essentially of binding the refractory particles together by applying thereto a reactive binder composition consisting essentially of;
 (a) a coal tar, and, for each 100 parts of coal tar,
 (b) from 25 to 100 parts of a polyisocyanate selected from the group consisting of tetramethylene diisocyanate hexamethylene diisocyanate, phenylene diisocyanate, toluene diisocyanate, diphenylmethane diisocyanate and toluene 2,4,6-triisocyanate and,
 (c) from 0.5 to 10 parts of a catalyst for the reaction of the coal tar with the polyisocyanate selected from the group consisting of trimethylamine, tetramethylene diamine, benzyldimethylamine, N-methyl morpholine, tris(dimethyl aminomethyl)phenol, cobalt naphthenate, dibutyl tin dilaurate triethanolamine, 2,2(phenylimino) diethanol, N,N,N',N'-tetrakis (2-hydroxypropyl) ethylene-diamine and oxypropylated diethylenetriamine,
from 10 to 80 parts of said binder being present per 1,000 parts of said refractory material.

8. An improvement in the process for the formation of molds for use in the production of metal castings by the introduction into a mold-defining structure of a mixture of a particulate refractory material and a binder for the refractory material, followed by reaction of the binder at ambient temperatures, which improvement consists essentially of binding the refractory particles together by applying thereto from 10–80 parts, per 1,000 parts of refractory material, of a reactive binder consisting essentially of;
 (a) a coal tar, and, for each 100 parts of coal tar,
 (b) from 25 to 100 parts of a polyisocyanate selected from the group consisting of tetramethylene diisocyanate, hexamethylene diisocyanate, phenylene diisocyanate, toluene diisocyanate, diphenylmethane diisocyanate and toluene 2,4,6-triisocyanate and,
 (c) from 0.5 to 10 parts of a catalyst for the reaction of the coal tar with the polyisocyanate selected from the group consisting of trimethylamine, tetramethylene diamine, benzyldimethylamine, N-methyl morpholine, tris(dimethyl aminomethyl)phenol, cobalt naphthenate, dibutyl tin dilaurate, triethanolamine, 2,2(phenylimino)diethanol, N,N,N',N'-tetrakis (2-hydroxypropyl) ethylene-diamine and oxypropylated diethylenetriamine and
 (d) from 0.05 to 10 parts of an active hydrogen-containing deep-set promoting agent selected from the group consisting of water; polyhydric alcohols; oxypropylated and oxyethylated sorbitol, pentaerythritol and trimethylolpropane; diepoxides and primary and secondary amines.

References Cited
UNITED STATES PATENTS

| | | | |
|---|---|---|---|
| 3,092,594 | 6/1963 | Heiss | 260—28 X |
| 3,182,032 | 5/1965 | Charlton et al. | 106—273 X |
| 3,255,500 | 6/1966 | Engel et al. | 106—38.7 X |
| 3,428,110 | 2/1969 | Walker et al. | 106—38.6 X |
| 3,372,083 | 3/1968 | Evans et al. | 260—28 X |

LORENZO B. HAYES, Primary Examiner

U.S. Cl. X.R.

106—273 N, 284